United States Patent
Schulz et al.

(10) Patent No.: US 7,889,212 B2
(45) Date of Patent: Feb. 15, 2011

(54) MAGNIFYING VISUAL INFORMATION USING A CENTER-BASED LOUPE

(75) Inventors: Egan Schulz, San Jose, CA (US); Andrew Lin, San Francisco, CA (US); Will Stein, Hillsborough, CA (US)

(73) Assignee: Apple Inc., Cupertino, CA (US)

( * ) Notice: Subject to any disclaimer, the term of this patent is extended or adjusted under 35 U.S.C. 154(b) by 283 days.

(21) Appl. No.: 11/518,476

(22) Filed: Sep. 7, 2006

(65) Prior Publication Data

US 2008/0062202 A1    Mar. 13, 2008

(51) Int. Cl.
G09G 5/00 (2006.01)
G06T 17/00 (2006.01)

(52) U.S. Cl. .................. 345/660; 345/428; 345/647
(58) Field of Classification Search ............... 345/428, 345/647
See application file for complete search history.

(56) References Cited

U.S. PATENT DOCUMENTS

| | | | |
|---|---|---|---|
| 4,343,037 A | 8/1982 | Bolton | |
| 5,187,776 A * | 2/1993 | Yanker | 715/800 |
| 5,283,557 A * | 2/1994 | Memarzadeh | 345/698 |
| 5,287,446 A * | 2/1994 | Williams et al. | 345/474 |
| 5,636,036 A | 6/1997 | Ashbey | |
| 5,638,523 A | 6/1997 | Mullet et al. | |
| 5,675,358 A | 10/1997 | Bullock et al. | |
| 5,754,348 A | 5/1998 | Soohoo | |
| 5,838,326 A * | 11/1998 | Card et al. | 715/775 |
| 6,005,679 A | 12/1999 | Haneda | |
| 6,085,112 A | 7/2000 | Kleinschmidt et al. | |
| 6,101,431 A | 8/2000 | Niwa et al. | |
| 6,111,586 A | 8/2000 | Ikeda et al. | |
| 6,130,665 A | 10/2000 | Ericsson | |
| 6,243,724 B1 | 6/2001 | Mander et al. | |
| 6,253,218 B1 | 6/2001 | Aoki et al. | |
| 6,415,320 B1 | 7/2002 | Hess et al. | |
| 6,618,498 B1 * | 9/2003 | Nakayama | 382/154 |
| 6,731,316 B2 | 5/2004 | Herigstad et al. | |

(Continued)

FOREIGN PATENT DOCUMENTS

EP    1 369 792 A2    12/2003

(Continued)

OTHER PUBLICATIONS

Dahl et al; Photoshop Elements 2 for Windows and Macintosh: Visual QuickStart Guide; Sep. 18, 2002; Peachpit Press; Sections from Chapters 1 and 3.*

(Continued)

*Primary Examiner*—Xiao M Wu
*Assistant Examiner*—David T Welch
(74) *Attorney, Agent, or Firm*—Hickman Palermo Truong & Becker LLP

(57) ABSTRACT

A method and apparatus for magnifying selected portions of visual information on a screen is provided. In response to receiving first user input, displaying, within a first bounded region that encloses a first portion of visual information, (a) the first portion at a same magnification level as the visual information that is outside of the first bounded region, and (b) a visual indication of a second bounded region that encloses a second portion of the visual information. In response to receiving second user input, displaying, within the first bounded region, the second portion of the visual information at a magnification level that is greater than the magnification level of the visual information that is outside of the first bounded region.

37 Claims, 10 Drawing Sheets

U.S. PATENT DOCUMENTS

| | | | |
|---|---|---|---|
| 6,738,154 B1 | 5/2004 | Venable | |
| 6,899,539 B1* | 5/2005 | Stallman et al. | 434/11 |
| 7,096,117 B1 | 8/2006 | Gale et al. | |
| 7,164,423 B1 | 1/2007 | Westen | |
| 7,202,878 B2 | 4/2007 | Safadi et al. | |
| 7,480,872 B1 | 1/2009 | Ubillos | |
| 2001/0014184 A1 | 8/2001 | Bubie et al. | |
| 2001/0056434 A1 | 12/2001 | Kaplan et al. | |
| 2002/0008721 A1 | 1/2002 | Fahraeus et al. | |
| 2002/0070982 A1 | 6/2002 | Hill et al. | |
| 2002/0158973 A1 | 10/2002 | Gomi | |
| 2002/0191867 A1 | 12/2002 | Le et al. | |
| 2003/0038787 A1 | 2/2003 | Nishiyama | |
| 2003/0084065 A1 | 5/2003 | Lin et al. | |
| 2003/0095697 A1 | 5/2003 | Wood et al. | |
| 2003/0123713 A1 | 7/2003 | Geng | |
| 2003/0179154 A1 | 9/2003 | Demsky et al. | |
| 2003/0189602 A1 | 10/2003 | Dalton et al. | |
| 2003/0223650 A1 | 12/2003 | Kim | |
| 2003/0227468 A1 | 12/2003 | Takeda | |
| 2004/0024758 A1 | 2/2004 | Iwasaki | |
| 2004/0056869 A1* | 3/2004 | Jetha et al. | 345/620 |
| 2004/0111332 A1 | 6/2004 | Baar et al. | |
| 2004/0228504 A1 | 11/2004 | Chang | |
| 2004/0240709 A1 | 12/2004 | Shoemaker | |
| 2004/0247174 A1* | 12/2004 | Lyons et al. | 382/154 |
| 2005/0134610 A1 | 6/2005 | Doyle et al. | |
| 2005/0163378 A1 | 7/2005 | Chen | |
| 2005/0177783 A1 | 8/2005 | Agrawala et al. | |
| 2005/0179705 A1 | 8/2005 | Ubillos et al. | |
| 2005/0197763 A1 | 9/2005 | Robbins et al. | |
| 2005/0262447 A1* | 11/2005 | Shoemaker | 715/762 |
| 2006/0119619 A1 | 6/2006 | Fagans et al. | |
| 2006/0220986 A1 | 10/2006 | Takabe et al. | |
| 2007/0035551 A1 | 2/2007 | Ubillos | |
| 2010/0079495 A1 | 4/2010 | Ubillos et al. | |

FOREIGN PATENT DOCUMENTS

| | | |
|---|---|---|
| GB | 2310988 A | 9/1997 |
| WO | WO 93/22738 A1 | 11/1993 |

OTHER PUBLICATIONS

Blacksun Software; "Magnifixer"; Dec. 6, 2004; Version 1.3.*
Magical Glass; The Freestone Group; Aug. 2005; pp. 1-5.*
The DragMag image magnifieir Colin Ware, Marlon Lewis May 1995 Conference companion on Human factors in computing systems CHI '95 Publisher: ACM Press.
A magnifier tool for video data Michael Mills, Jonathan Cohen, Yin Yin Wong Jun. 1992 Proceedings of the SIGCHI conference on Human factors in computing systems CHI '92 Publisher: ACM Press.
Baudisch, et al., "Focus Plus context screens: displays for users working with large visual documents", ACM, CHI 2002, extended abstracts on human factors in computing systems, Apr. 2002, 2 pages.
Mander, et al., "A Pile metaphor for supporting casual organization of information", ACM, CHI 1992, Proceedings of the SIGCHI conference on Human factors in computing systems, Jun. 1992, 8 pages.
Ware, et al., "The DragMag image magnifier", ACM, CHI 1995, Conference companion on human factors in computing systems, May 1995, 2 pages.
Graham, Adrian et al., "Time as essence for photo browsing through personal digital libraries", Proceedings of the $2^{nd}$ ACM/IEEE-CS joint conference on Digital libraries JCDL '02, Jul. 2002, 10 pages.
Rodden, Kerry, et al., "How do people manage their digital photographs?", Proceedings of the SIGCHI conference on Human factors in computing systems CHI '03, Apr. 2003, 8 pages.
Shneiderman, Ben, et al., "A Photo history of SIGCHI: evolution of design from personal to public, interactions", ACM, vol. 9, Issue 3, May 2002, 7 pages.
State Intellectual Property Office of the People's Republic of China, "The Second Office Action", application No. 200580034173.4, Dated Nov. 28, 2008, 7 pages.
Claims, application No. 200580034173.4, 4 pages.
Janssen, William C., et al., "UpLib: A universal personal digital library system", Nov. 2003, ACM, 9 pages.
Baudisch, Patrick, et al., "Keeping Things in Context: A Comparative Evaluation of Focus Plus Context Screens, Overviews, and Zooming", Information Sciences and Technologies Lab/Computer Science Lab Xerox, Palo Alto Research Center, Apr. 2002, 8 pages.
Perlin, K. et al., "An Alternative Approach to the Computer Interface" (1993) 11 pages.
"Text of the Second Office Action" received in Application Serial No. 200580034288.3 dated May 15, 2009 (2 pages).
Current claims of Application Serial No. 200580034288.3, Jun. 2009 (14 pages).
"Summons to attend oral proceeding pursuant to Rule 115(1) EPC" received in Application Serial No. 05256232.9-1225/1645950 dated Jun. 16, 2009 (8 pages).
Current claims of Application Serial No. 05256232.9-1225/1645950 as of Jul. 2009 (3 pages).
U.S. Appl. No. 10/960,339, filed Oct. 6, 2004, Notice of Allowance mailing date Mar. 9, 2010.
U.S. Appl. No. 10/960,887, filed Oct. 6, 2004, Final Office Action mailing date Jul. 22, 2009.
European Patent Office, European Search Report, App. No. 05256232.9, 9 pages.
Current Claims, EP App. No. 05256232.9, 6 pages, Mar. 9, 2006.
Baudisch, Patrick et al., "Keeping Things in Context: A Comparative Evaluation of Focus Plus Context Screens, Overviews, and Zooming," Proceedings of the SIGCHI Conference on Human Factors in Computing Systems, Apr. 2002, pp. 259-266.
Looser, Julian, et al.,"Through the Looking Glass: The Use of Lenses as an Interface Tool for Augmented Reality Interfaces," Copyright 2004 by the Association for Computing Machinery, Inc., 2004 ACM 1-58113-883-0, pp. 2004-2211.
Mander, Richard et al., "A 'Pile' Metaphor for a Supporting Casual Organization of Information," Striking a Balance, May 3-7, 1992, Monterey CA, pp. 627-634, XP00426843.
European Patent Office, "Communication pursuant to Article 96(2) EPC", Foreign Application No. PCT/US2005/035938, 7 pages, Oct. 16, 2007.
Claims, Foreign Application No. PCT/US2005/035938, 4 pages, Oct. 16, 2007.
International Business Machines Corporation, "Automated/customized method for window tiling", Research Disclosure Database No. 444135, published Apr. 2001, 3 pages.
European Patent Office, "Communication pursuant to Article 96(2) EPC", Foreign Application No. PCT/US2005/035943, 8 pages, Oct. 29, 2007.
Claims, Foreign Application No. PCT/US2005/035943, 5 pages, Oct. 29, 2007.
Apple Computer, Inc., "A 'Pile' Metaphor for Supporting Casual Organization of Information", ACM CHI '92, published May 1992, 8 pages.
European Patent Office, "International Search Report", Foreign Application No. PCT/US2007/019457, received Mar. 10, 2008, 11 pages.
Claims, Foreign Application No. PCT/US2007/019457, 11 pages, Mar. 10, 2008.
European Patent Office, "Communication Pursuant to Article 94(3) EPC", Application No. 05805830.6-1245, 11 pages.
Claims, Application No. 05805830.6-1245, 3 pages, May 28, 2008.
European Patent Office, "Communication pursuant to Article 94(3) EPC", application No. 05805830.6-1245, dated Dec. 2, 2009, 5 pages.
Claims, application No. 05805830.6-1245, 3 pages, Dec. 2, 2009.
International Business Machines Corporation, "Automated/Customized Method for Window Tiling", research disclosure database No. 444135, Kenneth Mason Publications Ltd., Apr. 2001, 3 pages.

* cited by examiner

MAGNIFIED VIEW STATE

MAGNIFYING VISUAL INFORMATION USING A CENTER-BASED LOUPE

CROSS-REFERENCE TO RELATED APPLICATIONS

This application is related to co-pending U.S. patent application Ser. No. 10/960,339, filed on Oct. 6, 2004, invented by Randy Ubillos and Stan Jirman, entitled "Viewing Digital Images On a Display Using a Virtual Loupe," the entire disclosure of which are hereby incorporated by reference for all purposes as if fully set forth herein.

FIELD OF THE INVENTION

The present invention relates to magnifying visual information that is displayed on a screen.

BACKGROUND

Information may be displayed on a screen at various levels of magnification. For example, a digital image may be shown at a reduced resolution relative to the original resolution of the digital image, such that a viewer of the reduced resolution digital image cannot determine details that are apparent to a viewer of the digital image at the original resolution. To assist a viewer of a reduced resolution digital image that is shown on a screen, a software application may provide functionality to enable the viewer to view a magnified portion of the digital image.

In one approach, a viewer may position a pointer over a digital image shown on a screen to cause a magnified view of a portion of the digital image to appear in a box in a fixed location on the screen. This approach is disadvantageous in that the box may cover part of the digital image. Additionally, since the box is in a fixed position on the screen, the viewer may find moving the pointer, while at the same time watching the magnified view of the digital image, to be awkward. Moreover, the pointer itself may obscure an area of interest on the digital image that the viewer wishes to view at a magnified level, which may impede the user's ability to locate the area of interest.

Certain text editors may allow the user to change the level of magnification at which a document is currently being displayed. This approach is disadvantageous because the change of magnification occurs instantaneous, and as a result, the user may become disoriented as to what he or she is viewing after a change in magnification. Further, the entire document is displayed at the same magnification level, and so it is not possible to view the "big picture," while inspecting a portion of the document at a higher level of magnification.

Certain first-person shooter games, such as Halo, enable a user to magnify a portion of a screen by simulating the use of a scoped rifle, e.g., a sniper rifle. In such programs, looking through the scope of a sniper rifle is simulated by showing a circle (corresponding to the scope) on the screen that encloses a magnified view of a certain area of the screen. Nothing else is shown on the screen except the circle that represents the sniper scope. The circle representing the sniper scope remains in a fixed position, although the user may change what portion of the screen is shown in the circle. This approach for viewing magnified portions of a screen is not appropriate or helpful when one wishes to view the magnified portion of the screen at the same time as other portions of the screen. For example, one may wish to view a magnified portion of a screen in context with the unmagnified portions of the screen.

Consequently, there is a need in the art to improve how one may view magnified portions of a screen without incurring the disadvantages of the above-described approaches. The approaches described in this section could be pursued, but have not necessarily been previously conceived or been pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Functional Overview

Embodiments of the invention enable selected portions of visual information displayed on a screen to be magnified using a virtual loupe. A virtual loupe is a user interface object that may be displayed over any portion of a screen, and which may be used by a user to magnify any portion of the screen. For example, a user may use the virtual loupe to magnify a portion of a digital image displayed on a screen. In this way, the user may use the virtual loupe to view a portion of the digital image at a higher level of magnification than the remainder of the digital image shown on the screen in a manner similar to how a user might use a physical loupe to view a magnified portion of a physical photograph. This is advantageous, as a physical loupe cannot be effectively used on a screen displaying electronic data.

While numerous examples shall be presented herein involving the use of the virtual loupe in the digital photography context, the virtual loupe may be used in a variety of contexts, including those outside of digital photography. For example, a user may use the virtual loupe to magnify any portion of a screen, such as a web page displayed by a web browser, an email, a toolbar, or a hierarchy of folders. In this way, the virtual loupe may serve as an accessibility feature to allow those who would prefer to view visual information displayed on a screen at a greater magnification level to do so.

Figure 1:
FIG. 1 is a graphical depiction of a screen that is displaying a virtual loupe according to an embodiment of the invention.

FIG. 1 is a graphical depiction of screen 10 that is displaying virtual loupe 100 according to an embodiment of the invention. As shown in FIG. 1, virtual loupe 100 depicts bounded region 110 that encloses the display of a portion of digital image 120. As shown in FIG. 1, the portion of digital image 120 displayed within bounded region 110 is displayed at a greater magnification level than the rest of digital image 120 is displayed at on screen 10. As explained in greater detail below, the portion of digital image 120 displayed within bounded region 110 may also be displayed at the same magnification level as the rest of digital image 120 to facilitate repositioning of virtual loupe 100.

Virtual loupe 100 may be positioned over any portion of screen 10. Thus, while virtual loupe 100 is shown positioned over digital image 120 in FIG. 1, virtual loupe 100 may be positioned by a user over toolbar 20 or heads up display (hud) 30. In an embodiment, the behavior of virtual loupe 100 may depend, at least in part, upon the area of screen 10 over which virtual loupe 100 is displayed. For example, virtual loupe 100 may exhibit different behavior when virtual loupe 100 is displayed over digital image 120 compared to when virtual loupe 100 is displayed over toolbar 20 or hud 30. In this way, the user will be able to use virtual loupe 100 appropriately for the context in which virtual loupe 100 is currently operating. To illustrate, if virtual loupe 100 is displayed over a digital image, the user may be able to view a magnified portion of the digital image in a certain way, and if virtual loupe 100 is displayed over a set of user interface controls, then the user may be able to view a magnified portion of the user interface controls in a different way.

Virtual loupe 100 may be moved by a user in response to a request to do so submitted by any input mechanism available to the user, e.g., the user may cause the virtual loupe 100 to be moved in accordance with the movement of a mouse pointer, and after the virtual loupe 100 have been moved to the desired location, the user may cause virtual loupe 100 to cease being moved in accordance with the movement of the mouse pointer.

As shall be discussed in further detail below, the magnified visual information displayed in bounded region 110 of virtual loupe 100 may correspond to visual information identified by either virtual loupe 100 or by another input device, such as a mouse pointer.

The functionality of the virtual loupe discussed herein may be provided by software executing on a computer system. A user may interact with the computer system using an input device operationally connected to the computer system. A computer system according to an embodiment of the invention shall be discussed in greater detail below with reference to FIG. 7.

Operating the Virtual Loupe

An approach for operating the virtual loupe shall be described with reference to FIG. 2, which is a flow chart illustrating the functional steps of using the virtual loupe according to an embodiment of the invention. The steps of FIG. 2 may be used to change the state of a virtual loupe between a "targeting" state and a "magnified view" state. Changing the state of a virtual loupe in this manner allows the virtual loupe to be easily positioned over a desired position by a user to facilitate viewing the desired position at a higher magnification level using the virtual loupe.

In an embodiment, the virtual loupe may, by default, be displayed in the magnified view state. Upon receiving user input (such as pressing a mouse button), the user may cause the virtual loupe to be displayed in the targeting state to facilitate repositioning of the virtual loupe on the screen. After receiving additional user input (such as releasing a mouse button), the display of the virtual loupe may be redisplayed in the magnified view state.

Figure 2:
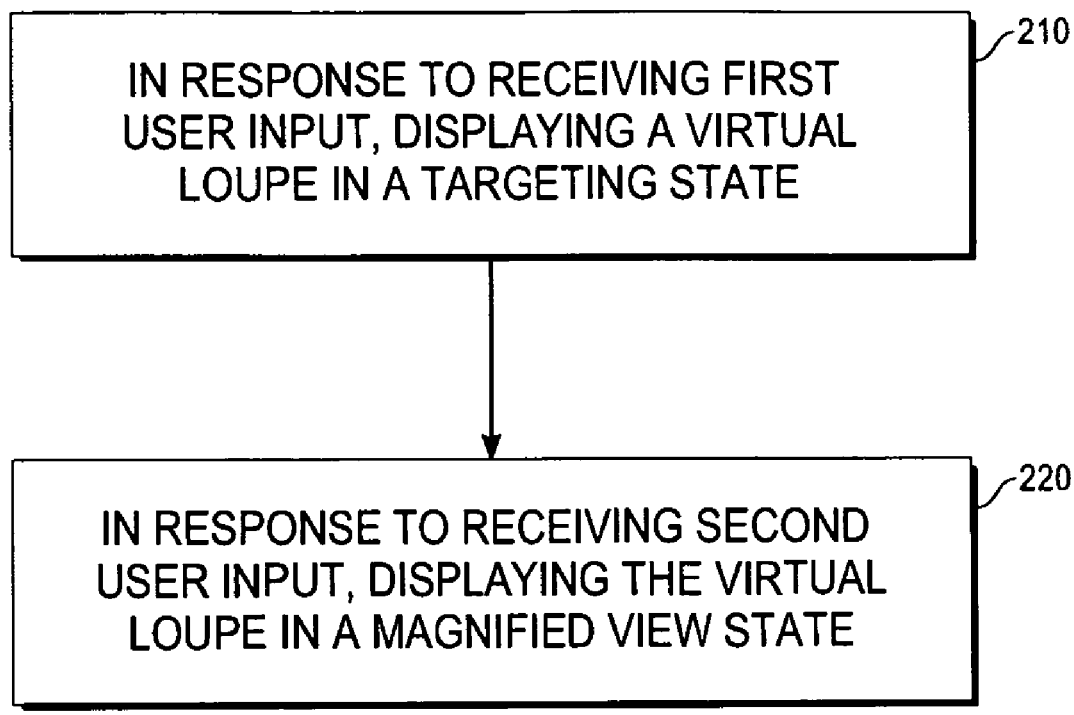
FIG. 2 is a flow chart illustrating the functional steps of operating the virtual loupe according to an embodiment of the invention.

In step 210 of FIG. 2, user input (denoted "first user input") is received from the user. The user may send the first user input of step 210 to cause the display of the virtual loupe to be updated to the targeting state. The targeting state is useful in repositioning of the virtual loupe.

The performance of step 210 will be described with reference to two figures, namely FIG. 3A, which is a graphical depiction of the display of virtual loupe 300 in the targeting state according to an embodiment of the invention, and FIG. 3B, which is a block diagram of virtual loupe 300 in the targeting state according to an embodiment of the invention.

Figure 3A:
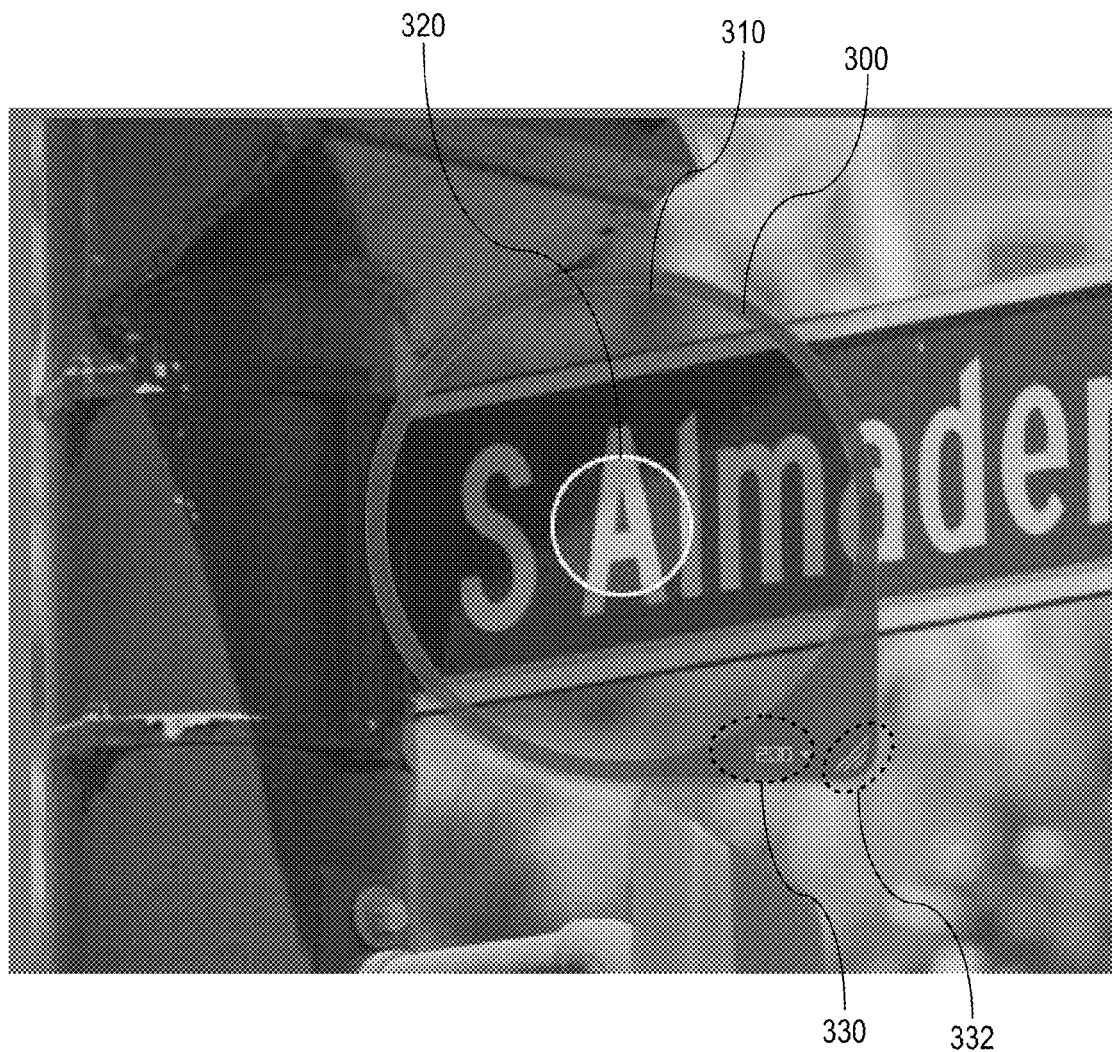
FIG. 3A is a graphical depiction of the display of a virtual loupe on a screen in the targeting state according to an embodiment of the invention.
Figure 3B:
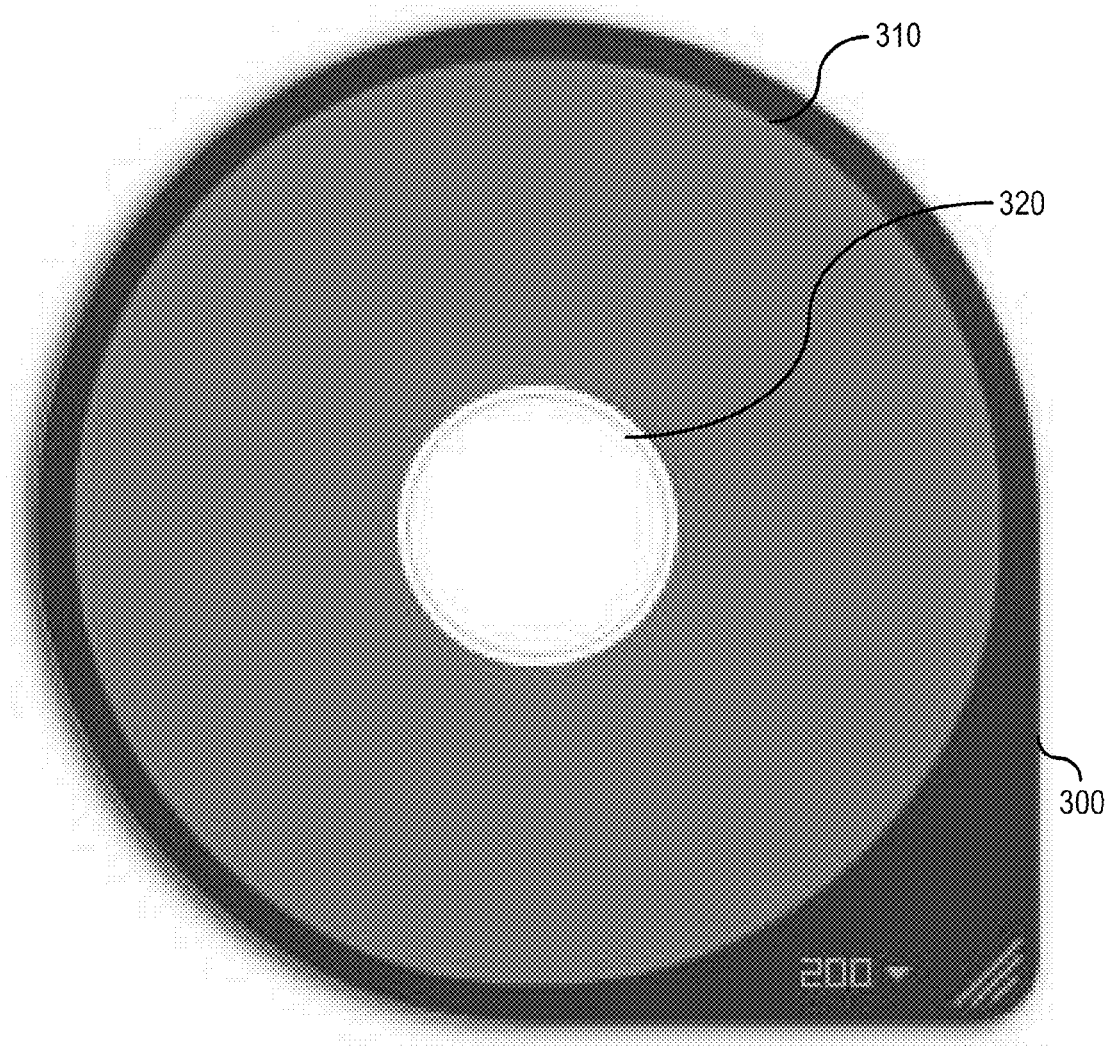
FIG. 3B is a block diagram of a virtual loupe in the targeting state according to an embodiment of the invention.

As shown in FIGS. 3A and 3B, the second bounded region identified by visual indication 320 corresponds to the portion of the screen that will be shown at a magnified level by virtual loupe 300 in first bounded region 310 when virtual loupe 300 is in the magnified view state.

The first user input of step 210 may be sent by the user using any input mechanism available to the user, e.g., the user may send the first user input by pressing a button on a keyboard or pressing a mouse button. In an embodiment, to send the first user input of step 210, the user may press and hold a button on a mouse when the mouse pointer is displayed inside of bounded region 310 of virtual loupe 300. When the software providing the functionality of virtual loupe 300 ("the loupe software") receives this first user input, the loupe software updates the display of virtual loupe 300 to reflect that virtual loupe 300 is in the targeting state. The display of virtual loupe 300 in the targeting state is shown in FIGS. 3A and 3B.

When virtual loupe 300 is in the targeting state, the loupe software updates the position of virtual loupe 300 on the screen in accordance with the movement of the mouse pointer or other input device. As a result, when virtual loupe 300 is in the targeting state, any movement of the mouse made by the user causes a corresponding movement of virtual loupe 300 on the screen.

Performing step 210 allows a user to configure the display of virtual loupe 300 so that the user may easily move virtual loupe 300 to a desired position. To illustrate, as shown in FIGS. 3A and 3B, virtual loupe 300 displays, within bounded region 310 that encloses a first portion of visual information, (a) a first portion of the visual information displayed on the screen at a same magnification level as the visual information that is displayed outside of first bounded region 310 on the screen, and (b) a visual indication 320 of a second bounded region that encloses a second portion of the visual information. For the convenience of explanation, visual indication 320 of the second bounded region shall be henceforth referred to as reticule 320. In an embodiment, the visual information enclosed by reticule 320 may identify what visual information will be displayed, at a magnified level, in first bounded region 310 of virtual loupe 300 when virtual loupe 300 is in the magnified view state.

To illustrate how step 210 may be performed in practice, a user may, prior to the performance of step 210, move virtual loupe 300 to a general area on the screen where the user ultimately wishes to position virtual loupe 300. In an embodiment, this may be accomplished by positioning a mouse pointer over any portion of virtual loupe 300 that is not within first bounded region 310, pressing a mouse button to select virtual loupe 300, moving the mouse to cause virtual loupe 300 to be moved in accordance with the movement of the mouse pointer, and subsequently release the mouse button to cease causing virtual loupe 300 to move in accordance with movement of the mouse pointer.

After placing virtual loupe 300 in the general area of interest, the user may "fine tune" the placement of virtual loupe 300 on the screen by performing step 210 in order to more accurately position virtual loupe 300 on the screen. The user may submit the first user input to the loupe software to place virtual loupe 300 in the targeting state, which causes the display of virtual loupe 300 to be updated as shown in FIG. 3B. After virtual loupe 300 is in the targeting state, the user may move virtual loupe 300 so that reticule 320 is positioned over a particular area of interest that the user wishes to view at a magnified level. As reticule 320 is visible to the user, and the visual information enclosed by first bounded region 310 is visible to the user, the user may move reticule 320 over the precise area in which the user wishes to view at a magnified level. When virtual loupe 300 is in the targeting state, virtual loupe 300 moves in accordance with the movement of a mouse pointer. In this way, the user may move, using a mouse, reticule 320 over the precise area on the screen in which the user wishes the view at a magnified level.

In an embodiment, reticule 320 may be identified in a manner that allows reticule 320 to be visible to the user regardless of which visual information is being displayed within first bounded region 310. For example, reticule 320 may appear to be a circle whose outline is identified using both a white band and a black band. In this way, reticule 320 will be visible to the user regardless of whether the visual information displayed in first bounded region 310 happens to be predominantly white or predominantly black.

After the user has positioned reticule 320 over an area of interest, the user performs step 220. In step 220 of FIG. 2A, user input (denoted "second user input") is received from the user for purposes of placing virtual loupe 300 in the magnified view state. The magnified view state is useful for viewing a portion of visual information, displayed on the screen and enclosed by reticule 320 when virtual loupe 300 is in the targeting state, at a greater magnification level than the portion is otherwise displayed on screen 350.

Figure 4A:
FIG. 4A is a graphical depiction of the display of a virtual loupe on a screen in the magnified view state according to an embodiment of the invention.
Figure 4B:
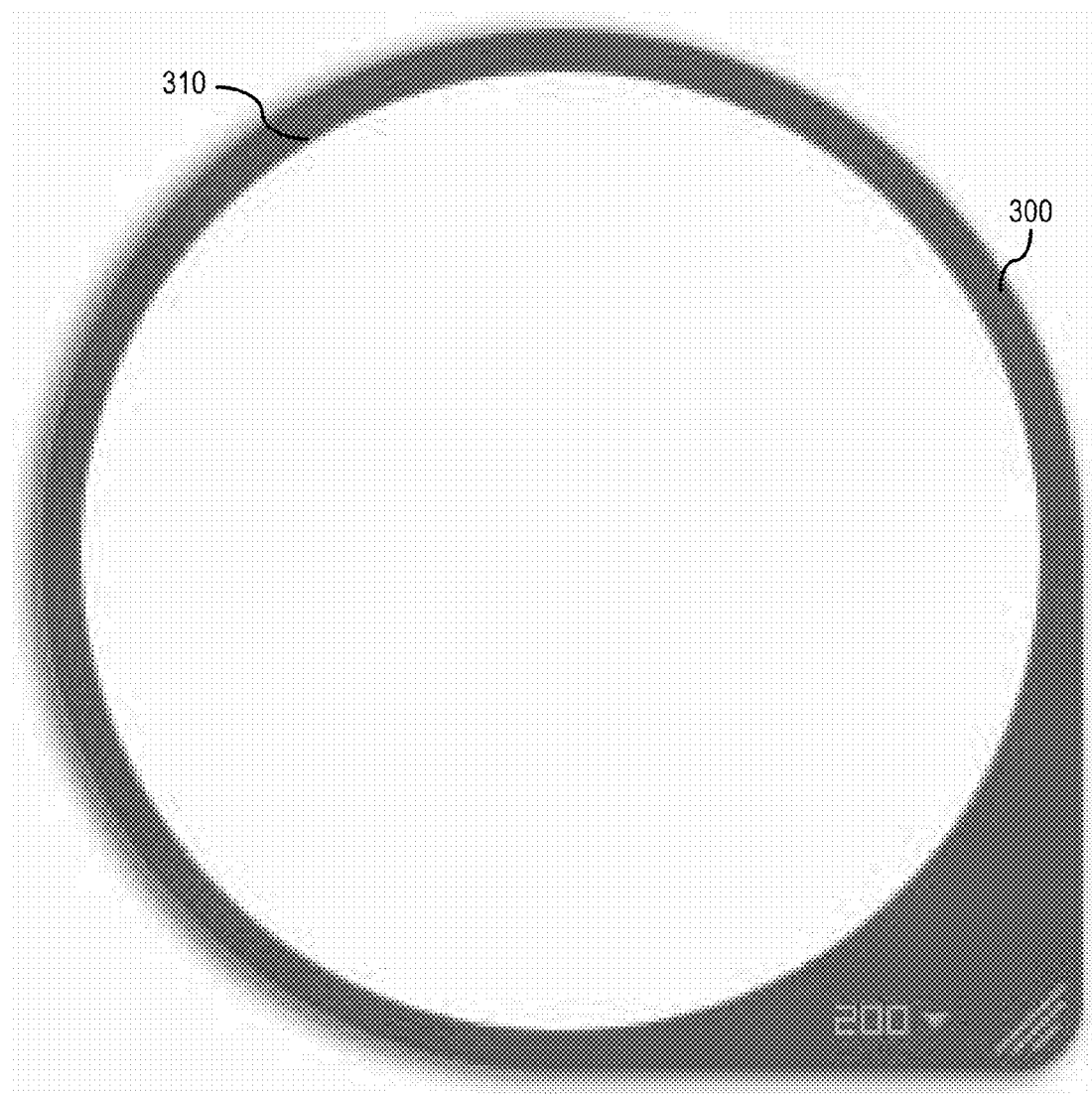
FIG. 4B is a block diagram of a virtual loupe in the magnified view state according to an embodiment of the invention.

The magnified view state is shown in FIG. 4A, which is a graphical depiction of the display of virtual loupe 300 on screen 350 in the magnified view state according to an embodiment of the invention, and FIG. 4B, which is a block diagram of virtual loupe 300 in the magnified view state according to an embodiment of the invention. In an embodiment, the visual information displayed in first bounded region 310 in the magnified view state corresponds to the visual information enclosed by the reticule 320 in the targeting state, except that the visual information is displayed at a magnified level in the magnified view state as compared to the targeting state.

The second user input of step 220 may be sent by the user using any input mechanism available to the user, e.g., the user may send the first user input by releasing a button (of either a keyboard or a mouse) that when pressed caused the first user input to be submitted, or by pressing a button. For example, pressing a button may cause the first user input of step 210 to be submitted to the loupe software, and releasing the same button may cause the second user input of step 220 to be submitted to the loupe software.

When virtual loupe 300 is in the magnified view state, virtual loupe 300 displays the portion of the visual information enclosed by reticule 320 when virtual loupe 300 is in the targeting state, within bounded region 310 at a magnification level that is greater than the magnification level of the visual information that is outside of the first bounded region. For example, the visual information depicted shown enclosed in first bounded region 310 of FIG. 4A is depicted at a magnified level as compared to the same visual information shown enclosed in reticule 320 of FIG. 3A.

In an embodiment, in response to the loupe software receiving the second user input of step 220, loupe software ceases to display reticule 320 on screen 350. For example, as shown in FIG. 4B, reticule 320 is no longer displayed.

Advantageously, by changing the state of virtual loupe 300 between the targeting state and the magnified view state, virtual loupe 300 may be easily positioned over a desired position by a user, and thereafter the desired position may be viewed at a magnified level relative to the remainder of screen 350 outside of virtual loupe 300. In this manner, a user may view the desired portion of screen 350 at a magnified level, while still viewing the desired portion in context with the remainder of screen 350.

Automatic Resizing of the Reticule

Information may be displayed on a screen at various levels of magnification. For example, a digital image (such as a thumbnail) may be shown at a reduced resolution relative to the original resolution of the digital image. A screen may display images at different levels of magnification. For example, a screen may display one or more thumbnail images (at a reduced resolution relative to the original resolution of the digital image represented by the thumbnail images) while simultaneously one or more digital images at the original resolution of the digital images (for example, each pixel of the screen may correspond to a pixel of the digital image.

Virtual loupe 300 may be positioned over any portion of screen 350. In doing so, virtual loupe 300 may be moved from a first area that is displayed at a first level of magnification on screen 350 to a second area that is displayed at a second level of magnification (which is different than the first level of magnification) on screen 350. For example, virtual loupe 300 may be moved from a digital image displayed at the original resolution to a thumbnail image that is displayed at a reduced resolution.

In an embodiment, when virtual loupe 300 moves from a first area that is displayed at a first level of magnification to a second area that is displayed at a different level of magnification, the size of reticule 320 dynamically changes to reflect the amount of visual information that may be displayed within first bounded region 310 at the magnification level at which the visual information is displayed. For example, if virtual loupe 300 is moved from a digital image displayed at the original resolution to a thumbnail image that is displayed at a reduced resolution, the size of reticule 320 will dynamically change to be a reduced size. This is so because visual information in the thumbnail is displayed at a reduced resolution compared to the digital image displayed at the original resolution, and as a result, a small area of visual information may be displayed within first bounded region 310. Similarly, if virtual loupe 300 is moved from a thumbnail image that is displayed at a reduced resolution to a digital image displayed at the original resolution, the size of reticule 320 will dynamically change to be an increased size.

Changing the Magnification Level Employed by the Virtual Loupe

In an embodiment, the magnification level at which visual information is displayed at in first bounded region 310 of virtual loupe 300, when virtual loupe 300 is in the magnified view state, (henceforth referred to simply as a "magnification level") may be changed. In an embodiment, a particular magnification level may be chosen from a menu (such as the menu 510 of FIG. 5, as described in further detail below) provided by virtual loupe 300. For example, a user may user a mouse to select a pull down menu available from virtual loupe 300, and from the menu, the user may be able to select from a variety of magnification levels. For example, the menu may allow the user to choose from a set of magnification levels ranging from 100% to 1600% (these values are merely exemplary, as any magnification level may be chosen from the menu). The use of a menu in virtual loupe 300 is described in additional detail below in the section entitled "The Use of Menus."

In another embodiment, rather than choosing from a set of discrete magnification levels from a menu, the user may smoothly zoom in and out using a scroll wheel of a mouse. For example, when the user scrolls a first direction on the scroll wheel of the mouse, the magnification level gradually increases, and when the user scrolls the opposite direction on the scroll wheel, the magnification level gradually decreases.

Figure 8:
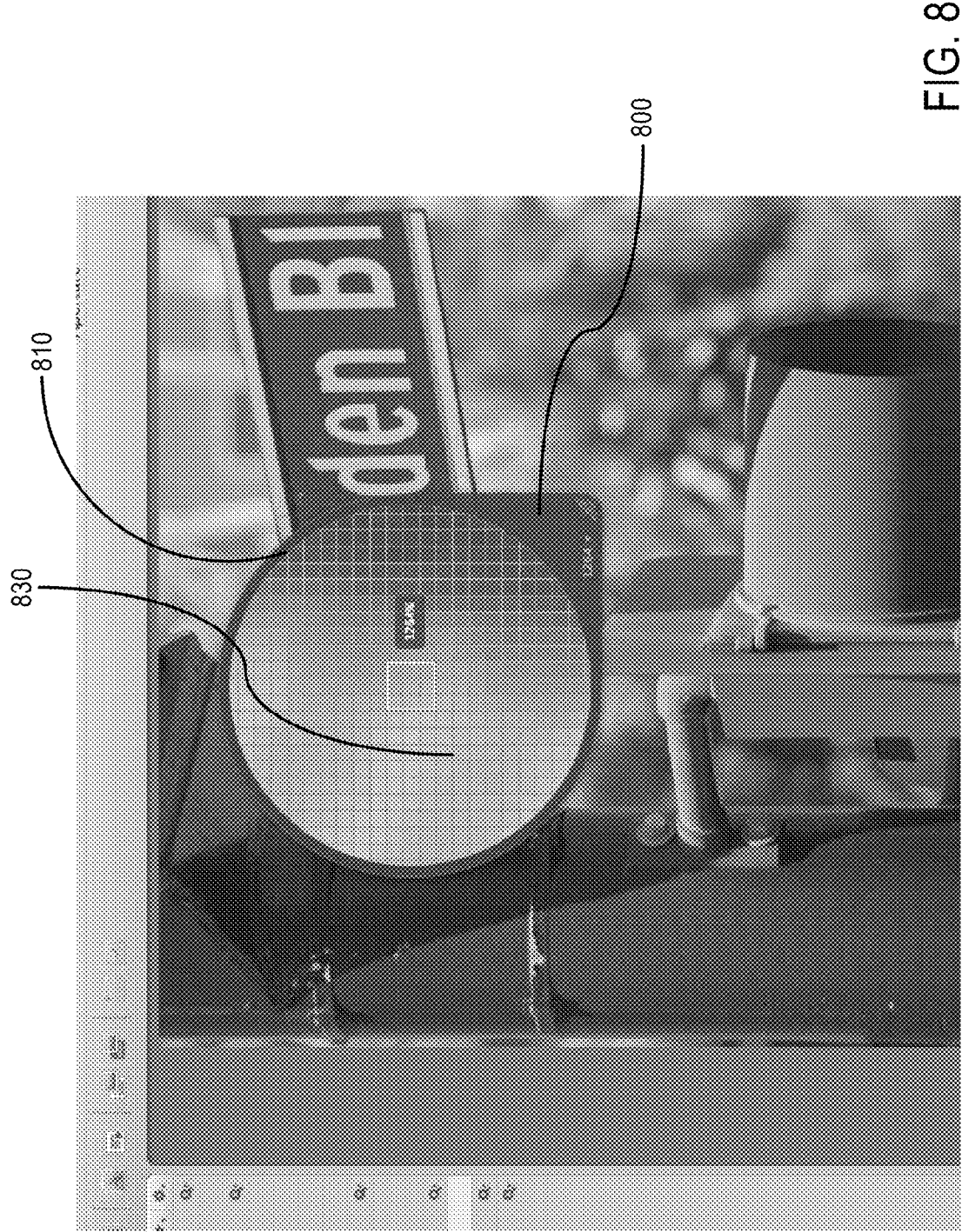
FIG. 8 is a graphical depiction of the display of a virtual loupe that displays a pixel grid according to an embodiment of the invention.

In an embodiment, the current magnification level may be displayed on the virtual loupe. For example, as shown in FIG. 3A, virtual loupe 300 displays a current magnification level at location 330 on the virtual loupe. In another example, which is depicted in FIG. 8, when the magnification level at which a virtual loupe displays visual information is changing, the current magnification level may be displayed in a location more visually prominent, such as a location within the first bounded region.

Virtual Loupe May be a Variety of Shapes

Virtual loupe 300 may be any shape. For example, first bounded region 310 and second bounded region 320 may each have any shape. In one embodiment, first bounded region and second bounded region each have the same shape. For example, first bounded region 310 and second bounded region may each be in the shape of a circle. Additionally, first bounded region 310 and second bounded region 320 may each have a shape that corresponds to a square, a rectangle, an oval, and a user-configurable shape.

In an embodiment, first bounded region 310 and second bounded region 320 each have the same center point. For example, if first bounded region 310 and second bounded region 320 each correspond to a circle, then in such an embodiment, first bounded region 310 and second bounded region 320 are concentric.

Virtual Loupe May be Resized to any Number of Sizes

Virtual loupe 300 may be any size, and may be resized to any number of sizes. In an embodiment, the size of virtual loupe 300 may be dynamically changed in response to loupe software receiving input from the user. For example, in response to receiving user input, loupe software may change the size of first bounded region 310 from a first size to a second size through a series of one or more intermediate sizes. In this way, the changing of the size of virtual loupe 300 may be intuitively displayed to the user.

In an embodiment, second bounded region 320 may change in size in proportion to the change in size of first bounded region 310. As first bounded region 310 and second bounded region 320 may share the same center point, during the changing of size of virtual loupe 300, the center point of first bounded region 310 and second bounded region 320 does not move. This is advantageous, as the image being displayed in first bounded region 310 does not lose focus, and visual continuity is maintained to the user viewing the resizing of virtual loupe 300.

In an embodiment, during the process of updating the display of virtual loupe 300 to a new size, visual information enclosed in reticule 320 is depicted at a same level of magnification during the changing of the size of virtual loupe 300 as visual information enclosed in first bounded region 310.

In an embodiment, the size of virtual loupe 300 may be changed by a user selecting virtual loupe 300, and subsequently moving the mouse in a direction to indicate whether the size of virtual loupe 300 should increase or decrease. For example, the user may select virtual loupe 300 using a mouse at control 332, as shown on FIG. 3A. Once control 332 is selected, moving the mouse in one direction causes the size of virtual loupe 300 to increase, and moving the mouse in the other direction causes the size of virtual loupe 300 to decrease.

The display of control 332 may dynamically change as the size of virtual loupe 300 changes. This is advantageous, because as the size of virtual loupe 300 decreases, the amount of available space on virtual loupe 300 to display control 332 decreases. As a result, as the amount of available space on virtual loupe 300 decreases when the size of virtual loupe 300 decreases, the display of control 332 may be updated so that the visual appearance of control 332 becomes smaller or less complex. For example, as shown in FIG. 3A, control 332 includes a set of three lines. As the size of virtual loupe 300 decreases, the number and/or the size of the lines included in control 332 may decrease. Similarly, as the amount of available space on virtual loupe 300 increases when the size of virtual loupe 300 increases, the display of control 332 may be updated so that the visual appearance of control 332 becomes larger or more complex.

The Summon Feature

In an embodiment, the user may cause virtual loupe 300 to cease to be displayed on screen 350. In such an embodiment, in response to loupe software receiving user input, loupe software may cease displaying the virtual loupe 300 on screen 350. However, when loupe software ceases to display virtual loupe 300 on screen 350, loupe software maintains data that identifies where virtual loupe 300 was previously displayed on screen 350. In this way, in response to receiving user input that requests virtual loupe 300 to be displayed on screen 350, virtual loupe 300 may be displayed in the same position virtual loupe 300 previously occupied on screen 350 prior to virtual loupe 300 cease being displayed. In another embodiment, each time virtual loupe 300 is redisplayed on screen 350, virtual loupe 300 may be displayed at the same position on screen 350.

As screens may be large, and virtual loupe 300 may be moved to any position on a screen, when virtual loupe 300 is redisplayed on a screen, it may not be immediately apparent to the user where virtual loupe is positioned on the screen. Advantageously, embodiments of the invention may support a "summon feature," which provides for displaying virtual loupe 300 if it is not currently being displayed, and moving virtual loupe 300 to a position identified by the user.

To illustrate how the summon feature may be implemented in an embodiment, in response to loupe software receiving user input, loupe software may (a) display virtual loupe 300 on screen 350 at the position it was last displayed, and (b) cause the display of virtual loupe 300 to be automatically moved, on screen 350, through a series of intermediate positions arranged in a line, from an initial position to an end position that is identified by the user. For example, the end position may correspond to a position identified by a mouse pointer.

The series of intermediate positions through which virtual loupe 300 moves through are determined based upon the initial position and the end position, identified by the user, of virtual loupe 300 and are not determined based on movement of the mouse pointer. For example, in one embodiment, to use the summon feature, the user may press and hold a button on the keyboard. In response, if virtual loupe 300 is not currently displayed, then it is displayed on screen 350 at the last position in which virtual loupe 300 was displayed. Additionally, virtual loupe 350 will be moved across screen 350 to a position occupied by the mouse pointer. While virtual loupe 350 is moving across screen 350 to the position occupied by the mouse pointer, no additional input or movement from the mouse is necessary for virtual loupe 350 to be moved to the current position of the mouse pointer on screen 350.

In an embodiment, the user may send user input to request a performance of the summon feature by pressing and holding a certain button. Merely pressing the same button, but without holding the button for an extended duration, may cause virtual loupe 300 to cease being displayed on screen 350 if it is currently being displayed or cause virtual loupe 300 to be redisplayed on screen at the position at which it was last displayed if virtual loupe 300 is not currently being displayed. In this way, the same button may be used by the user to request a performance of the summon feature and toggle the display of virtual loupe 300 on screen 350.

In another embodiment, the user may send user input to request a performance of the summon feature by "shaking" the mouse. To elaborate, loupe software may detect when the mouse is being moved back and forth, and may interpret such movement as "shaking." Loupe software may be configured to perform the summon feature in response to determining that the user is shaking the mouse.

The Pixel Grid

In an embodiment, a pixel grid may be displayed in the first bounded region 310 of virtual loupe 300. A pixel grid is a grid that identifies the pixels within the visual information being displayed in the first bounded region when virtual loupe 300 is in the magnified view state.

FIG. 8 is a graphical depiction of the display of virtual loupe 800 that displays a pixel grid 830 in first bounded region 810 according to an embodiment of the invention. In an embodiment, in response to the loupe software receiving user input from the user, the loupe software causes pixel grid 830 to be displayed over first bounded region 810. Pixel grid 810 identifies pixels in the visual information displayed within first bounded region 810.

The magnification level at which the visual information is displayed at in first bounded region 810 may be changed as explained above. If the magnification level at which the visual information is being displayed exceeds a specified threshold, then loupe software may cease displaying pixel grid 830 over the visual information displayed in first bounded region 810 without receiving a request, from a user, to do so.

Ceasing to display the pixel grid in this manner is advantageous, as given the current limitations of display technology, at some point as the magnification level decreases, more grid lines may be displayed on a screen than the pixels that they identify. Additionally, as at some point when the magnification level decreases below a certain point, the human eye can no longer identify the pixels within the visual information being displayed. As a result, it is no longer useful to display the pixel grid when the magnification level decreases below a certain point.

Use of Multiple Virtual Loupes

Embodiments of the invention may employ any number of virtual loupes. Thus, while many examples and figures of the present application, discussed herein, are directed towards the use of a single virtual loupe, loupe software may provide for displaying any number of virtual loupes upon a single screen. Such an embodiment may be advantageous, as a user may use to use a virtual loupe on each of two or more distinct units of visual information, e.g., a user may wish to use a separate virtual loupe on each of two or more digital images that are displayed on a screen.

Modes of the Virtual Loupe

In an embodiment, the behavior of the virtual loupe may be configured by instructing the virtual loupe to operate in one of a plurality of modes. Such modes include a "focus-on-loupe" mode, a "focus-on-cursor" mode, and a "cursor-attached" mode. When virtual loupe 300 is in a particular mode, the behavior of virtual loupe 300 may differ from that described with reference to other embodiments. For ease of explanation, the focus-on-loupe mode of virtual loupe 300 shall correspond to the behavior of the virtual loupe as described in the section entitled "Operating the Virtual Loupe."

In focus-on-cursor mode, when virtual loupe 300 is in the magnified view state, the visual information displayed within first bounded region 310 of virtual loupe 300 corresponds to visual information identified by a mouse pointer, rather than reticule 320 as in the normal mode. Thus, when a user moves a mouse pointer across screen 350, the visual information displayed within first bounded region 310 of virtual loupe 300 will change according to the current position of the mouse pointer.

For example, a user may position (or "park") virtual loupe 300 somewhere on a screen, e.g., at some position away from the content that is of interest to the user, such as a corner of the screen that is not displaying visual information associated with an application. By moving the mouse cursor over the visual information, displayed on the screen, associated with the application, the user may view the visual information identified by the mouse cursor at a magnified level in virtual loupe 300. In this way, the user can view visual information for many different locations (i.e., those locations identified by the current position of the mouse pointer), at a magnified level, in a single location.

In the focus-on-cursor mode, when the mouse pointer moves from outside of first bounded region 310 to inside first bounded region 310, the visual information displayed within first bounded region will adjust so that, rather than the visual information displayed within first bounded region 310 being centered upon the current position of the mouse pointer, the visual information displayed within first bounded region 310 is centered within first bounded region 310. Note that when the visual information displayed within first bounded region changes in this fashion, the position of first bounded region 310 on screen 350 does not change. In an embodiment, when the visual information displayed within first bounded region changes in this fashion, the change is not instantaneous, but rather is a gradual move, so that the user can visually identify that the focus of the visual information displayed with first bounded region 310 is being shifted from the current position of the mouse pointer to being centered within first bounded region 310.

In cursor-attached mode, the user may cause the mouse pointer (or mouse "cursor") to "attach" to virtual loupe 300, thereby effectively merging the mouse pointer into the virtual loupe 300, so that the user may directly control to the position of virtual loupe 300 on screen 350 by moving the mouse. In an embodiment, the user may cause a virtual loupe to enter cursor-attached mode by double-clicking a mouse cursor on a virtual loupe or selecting an option in a menu provided by the virtual loupe, although other types of input are possible, e.g., a option on a menu provided by virtual loupe 300 may be selected.

To illustrate, in an embodiment, the user may double-click a mouse button when the mouse pointer is position (a) over virtual loupe 300, and (b) is not positioned within first bounded region 310. When the loupe software receives this user input, the loupe software causes virtual loupe 300 to enter cursor-attached mode. In cursor-attached mode, virtual loupe 300 is the mouse pointer. As a result, any movement of the mouse causes a corresponding movement in virtual loupe 300 on the screen. At this point, if the user presses a mouse button, then loupe software will interpret this input as first user input in accordance with step 210, and if the user releases the mouse button, then loupe software will interpret this input as second user input in accordance with step 220. If the user double-clicks a mouse button, the user will exit cursor-attached mode, and will enter normal mode.

In an embodiment, when the user enters cursor-attached mode, the current position of virtual loupe 300 may change so that virtual loupe 300 is centered upon the current position of the mouse pointer. This movement, rather than being instantaneous, may be made gradually over a short amount of time so that it is intuitive to the user that the virtual loupe is moving towards the current position of the mouse pointer.

In an embodiment, when the virtual loupe is in focus-on-cursor mode, and then the virtual loupe enters cursor-attached mode, the display of the virtual loupe may be updated so that the virtual loupe gradually moves to be centered upon the cursor. The location of the virtual loupe will be gradually moved so that the virtual loupe becomes centered upon the location of the mouse cursor. In this way, the user will be able to visually ascertain that the position of the center of the virtual loupe is being moved to the position of the mouse cursor.

Viewing a Change in the Virtual Loupe First

In an embodiment, prior to making a change that affects the visual appearance of visual information displayed on a screen, the change may initially be previewed in the visual information displayed by virtual loupe 300. For example, a user might wish to change the luminance value of each pixel of a digital image in a certain manner. Such a change requires a certain amount of processing resources to affect the change across the entire digital image.

If virtual loupe 300 is positioned over the digital image, then embodiments of the invention allow for just the display of the pixels enclosed by first bounded region 310 of virtual loupe 300 to reflect the change prior to affecting the change across the entire digital image, e.g., virtual loupe 300 may be in the magnified view mode, thereby providing a magnified view of the result of the requested change. In response to receiving user input that accepts the requested change, the requested change may then be made to the remainder of the digital image. In this way, the processing required to affect the change across the entire digital image may be postponed until the user verifies that the requested change meets with his or her approval, thereby avoiding the expenditure of resources to affect the change across the entire intended area until the expenditure of such resources have been verified as being worthwhile.

The Use of Menus

Figure 5:
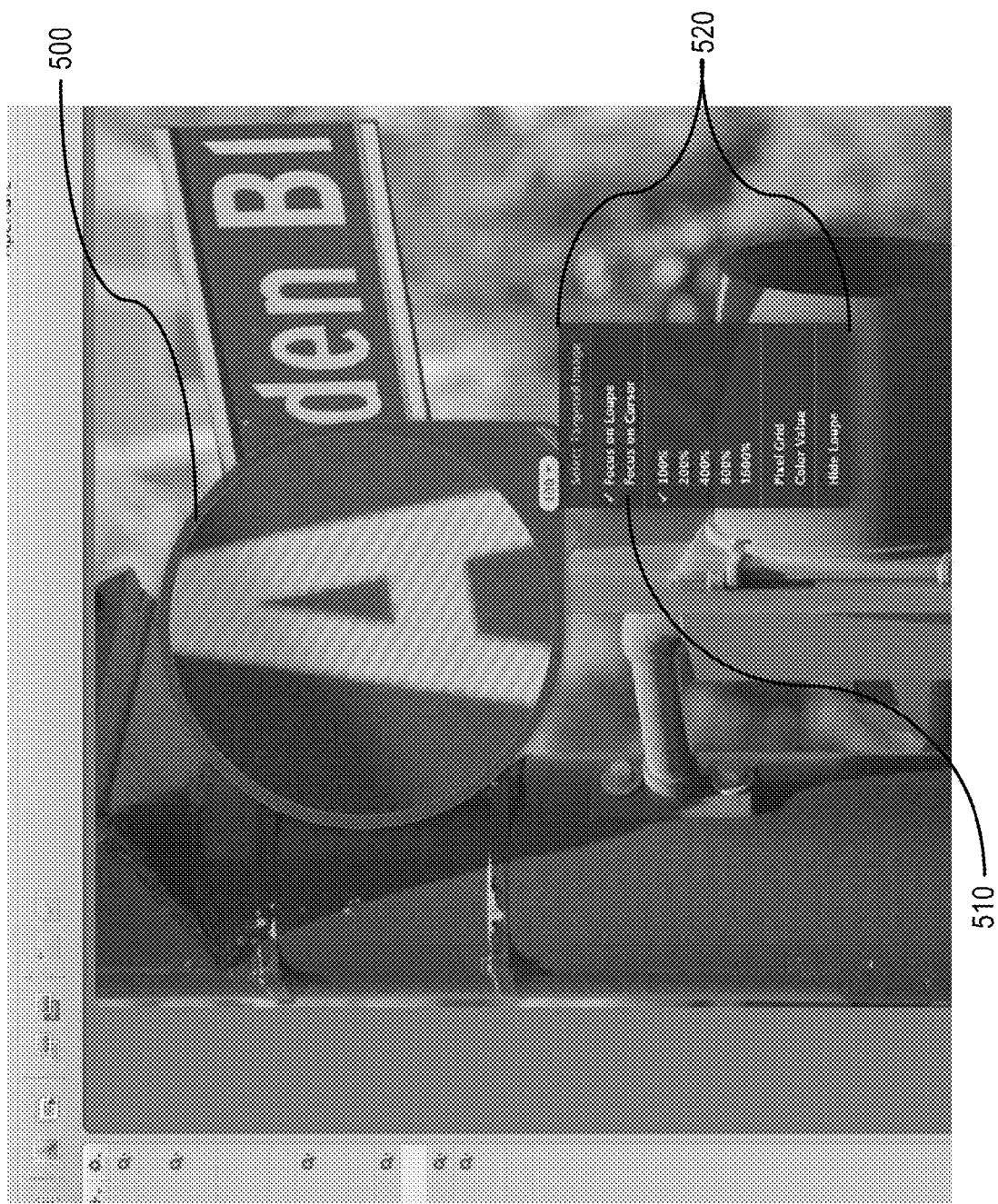
FIG. 5 is a graphical depiction of the display of a virtual loupe that provides a menu according to an embodiment of the invention.

In an embodiment, a virtual loupe may enable a user to configure the behavior of the virtual loupe using a menu. To illustrate, FIG. 5 illustrates virtual loupe 500 that provides a menu according to an embodiment of the invention. As shown in FIG. 5, a user may user a mouse to select menu 510, and subsequently the user may select a certain entries from the set of entries 520 listed in menu 510. Selecting a particular entry causes the performance of the function associated with that entry. As a result, the user may select a particular entry to perform any function discussed herein or otherwise available to virtual loupe 500.

As previously explained, a virtual loupe may be resized to any size. In an embodiment, if virtual loupe 500 is resized to a size that is smaller than a specified threshold, then menu 510 may no longer be displayed on virtual loupe 500. In this way, when the size of virtual loupe 500 becomes too small to accommodate the display of menu 510 on virtual loupe 500, menu 510 is automatically no longer displayed. Thus, if the user wishes to resize virtual loupe 500 to a size that no longer supports menu 510 but virtual loupe 500 is otherwise operational, the user may do so.

Providing Information about Displayed Visual Information

Figure 6:
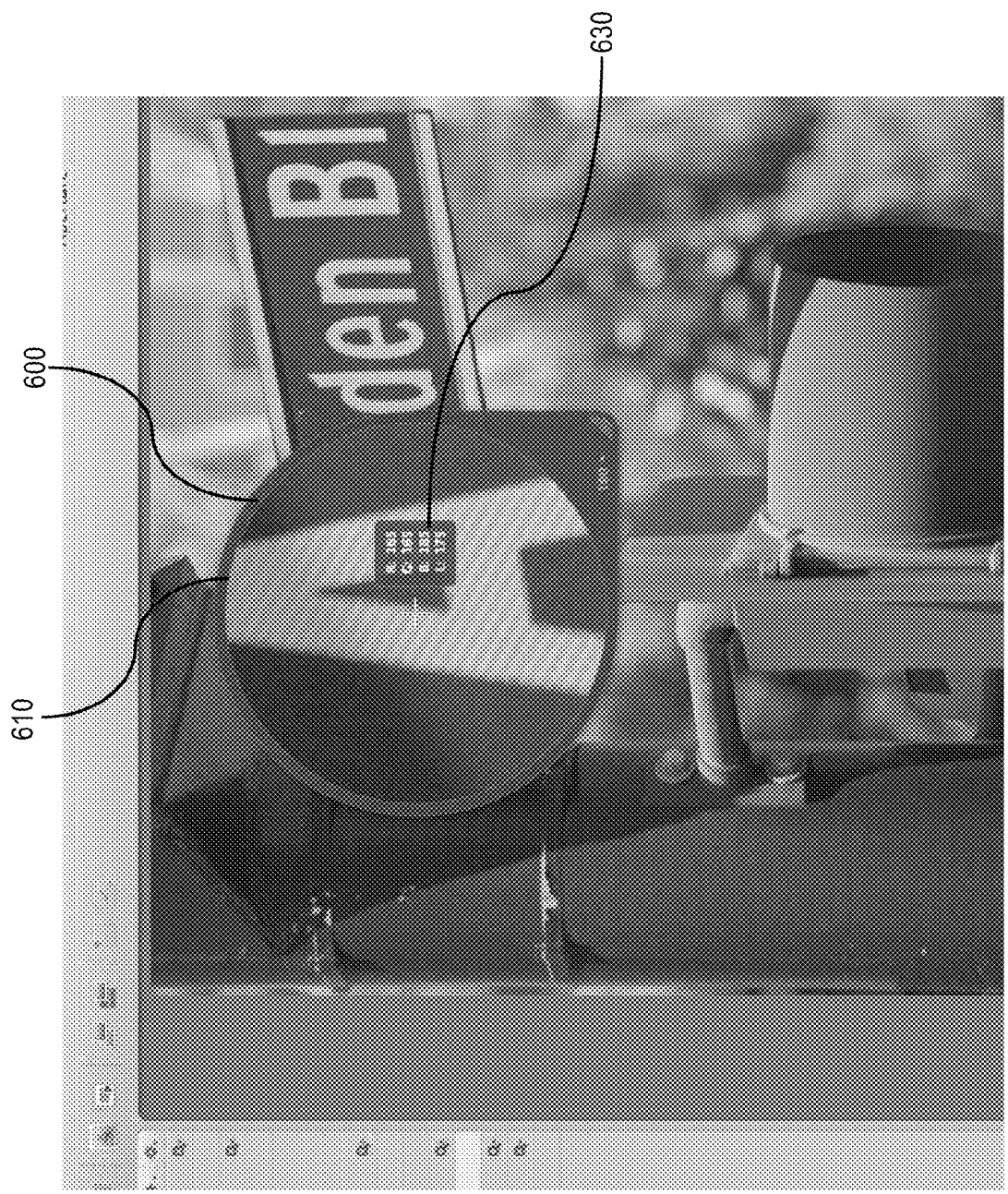
FIG. 6 is a graphical depiction of the display of a virtual loupe that provides a color and luminance meter according to an embodiment of the invention.

In an embodiment, a virtual loupe may display information about the visual appearance of portions of the visual information displayed the virtual loupe. FIG. 6 is a graphical depiction of the display of virtual loupe 600 that provides a color and luminance meter 630 according to an embodiment of the invention. Color and luminance meter 630 provides information about the color and luminance of a portion of visual information (for example a pixel) identified by virtual loupe 600.

In an embodiment, color and luminance meter 630 may provide information about the color and luminance of a pixel that is in the center of first bounded region 610. In another embodiment, color and luminance meter 630 may provide information about the color and luminance of a pixel that id identified by a mouse pointer that is within first bounded region 610. Other embodiments of the invention may provide additional information about an identified portion of visual information other than color and luminance information.

Providing Accessibility Functionality

In an embodiment, the loupe software may be implemented as an application executing on a computer system. For example, the loupe software may be comprised within an application used by digital photographers, such as Aperture available from Apple Computer Inc. of Cupertino Calif. In such an embodiment, virtual loupe 300 may be used to view any portion of a screen (even those outside of the application providing the loupe software) as long as the application providing the loupe software is currently being executed. For example, virtual loupe 300 may be used to magnify images maintained by other applications different than the application comprising the loupe software.

In another embodiment, the loupe software may be implemented as part of an operating system. Such an embodiment is advantageous because, as the operating system is always executed by a computer system, the virtual loupe would always be available to the user.

A user may use the virtual loupe to magnify any portion of a screen, such as a web page displayed by a web browser, an email, a toolbar, or a hierarchy of folders. In this way, the virtual loupe may serve as an accessibility feature to allow those who would prefer to view visual information displayed on a screen at a greater magnification level to do so. For example, a visually impaired person may choose to use the virtual loupe to assist them in reading their email, operating any application installed on a computer system, or surf the web using an Internet browser.

Multi-Mode

In an embodiment, the behavior of a virtual loupe may be configured to operate differently. For example, in an embodiment, the behavior of a virtual loupe may be switched from operating according to a center-based approach as discussed herein to an offset-based approach as discussed in U.S. patent application Ser. No. 10/960,339. In such an embodiment, a user may first use a virtual-loupe in a center-based approach, and may thereafter configure the virtual loupe to operate in the offset approach, or vice-versa. In this way, a single virtual loupe may operate in both a center-based mode and a offset mode.

Loading Notification

In an embodiment, when a virtual loupe is instructed to display a portion of an image, and the image is not immediately available for display (for example, the image may need to be loaded into cache memory), then the virtual loupe may display a notification to the user indicating that the virtual loupe will display the image as soon as it becomes available (for example, as soon as the image is loaded into cache memory). To illustrate, a virtual loupe may display the text "loading" while an image, which the virtual loupe has been instructed to show, is being loaded into cache memory.

Selecting an Image Obscured by the Virtual Loupe

A virtual loupe may be sized so that it is actually larger than a digital image, or other selectable item, over which it is positioned. For example, a screen may display a thumbnail image, and the virtual loupe may be displayed directly over the thumbnail image.

In certain contexts, selecting an item displayed on a screen causes certain things to happen relative to the selected item. For example, a screen may display (a) a row of thumbnail images, and (b) a larger version of a selected image in the row of thumbnail images. In this example, if the particular thumbnail image that is selected changes from one image to a second image, then the display of the larger version of the selected image would correspondingly change from the first image to the second image.

In an embodiment, positioning a virtual loupe over a selectable item, such as a digital image, automatically selects the selectable item.

In another embodiment, positioning a virtual loupe over a selectable item, such as a digital image, does not automatically select the selectable item. In such an embodiment, the user may submit user input to select a selectable item over which the virtual loupe is displayed. Such user input may include selecting an entry on a menu provided by the virtual loupe or pressing a certain button. As a result, a virtual loupe may be displayed over a selectable item, such as a digital image, without selecting the selectable item. However, the user may select any selectable item that is being displayed, in whole or in part, by virtual loupe by submitting user input to the loupe software.

Implementing Mechanisms

Figure 7:
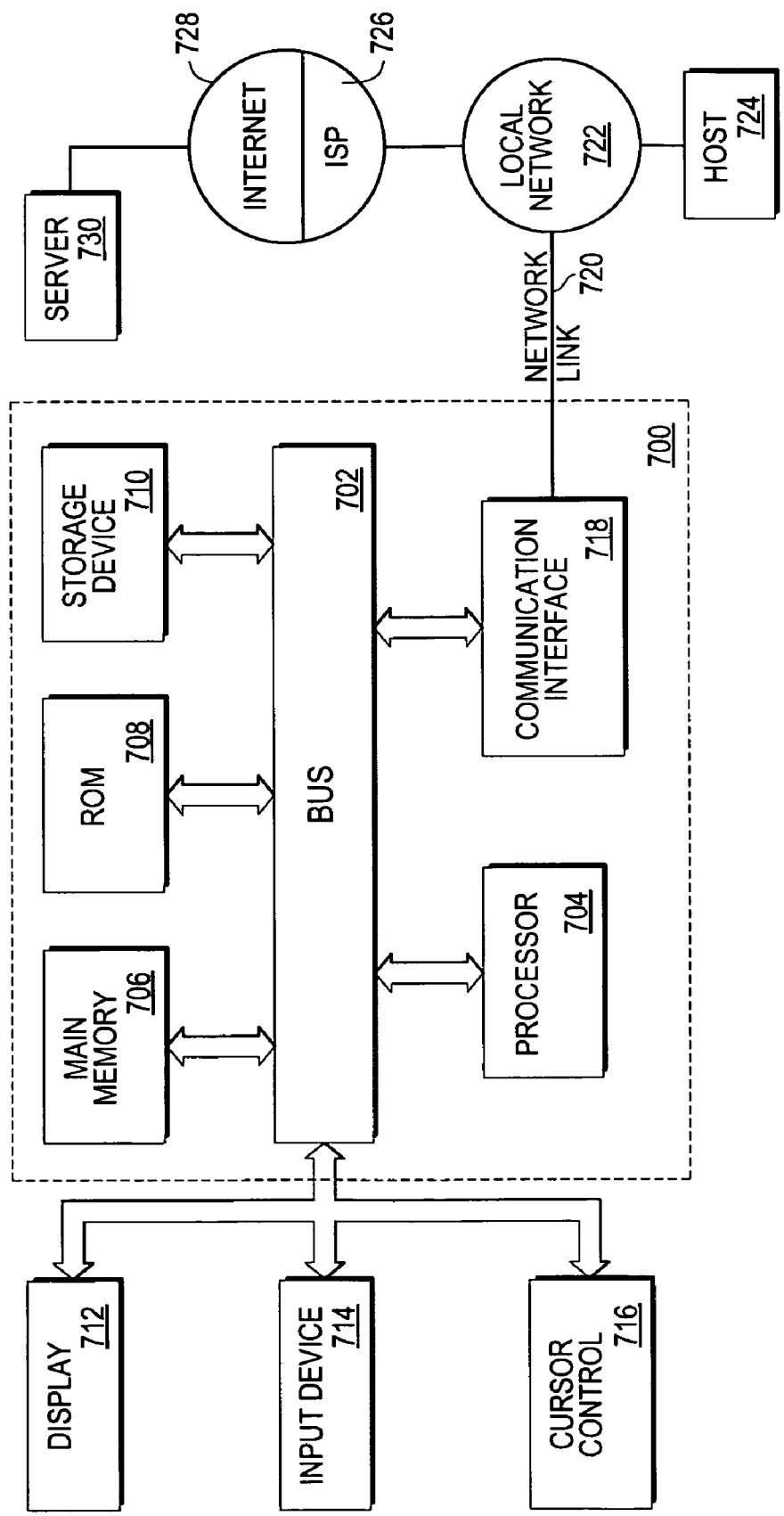
FIG. 7 is a block diagram that illustrates a computer system upon which an embodiment of the invention may be implemented.

The loupe software may be comprised within an application or an operating system executing on a computer system. FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT) or a Liquid Crystal Display (LCD), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for magnifying selected portions of visual information on a screen, comprising:

in response to receiving user input, displaying an object, representing a loupe, that includes a first visual indicator indicating a first bounded region for displaying a part of the visual information;

wherein the visual information has a first portion and a second portion;

wherein said object operates in a plurality of modes that includes at least a first input-mode and a second input-mode;

while said object is operating in said first input-mode, displaying the object without displaying a separate input focus, and displaying, within the first bounded region, at a magnification level that is greater than the magnification level of the visual information that is outside of the first bounded region, the first portion of the visual information that is determined by a current location of the object;

while said object is operating in said first input-mode, in response to a first single user input action, switching from operating in said first input-mode to operating in said second input-mode by ceasing movements of said object in accordance with movements of the input focus and displaying the input focus on the screen separate from the object;

while said object is in said second input-mode, continuously updating content displayed within the first bounded region as the input focus moves independently of the object;

wherein, while said object is in said second input-mode, the content displayed within the first bounded region is centered upon a current location of the input focus, and displayed at a magnification level that is greater than the magnification level of the visual information that is outside of the first bounded region;

while said object is operating in said second input-mode, in response to a second single user input action, switching from operating in said second input-mode to operating in said first input-mode by resuming movements of said object in accordance with movements of the input focus and ceasing displaying the input focus on the screen separate from the object;

wherein the method is performed by a computer programmed to be a special purpose machine pursuant to instructions from program software.

2. The method of claim 1, wherein said first single user input action and said second single user input action are any of: pressing a button and ceasing pressing said button.

3. The method of claim 1, wherein said first bounded region has a shape of any one of: a circle, a square, a rectangle, an oval, and a user-configurable shape.

4. The method of claim 1, further comprising:
in response to receiving third user input while said input focus is positioned at a particular position, automatically moving, on said screen, said object, through a series of intermediate positions arranged in a line, from an initial position to the particular position,
wherein said series of intermediate positions are determined based upon said initial position and said particular position and are not determined based on movement of said input focus.

5. The method of claim 1, further comprising:
in response to receiving third user input, moving said first bounded region on said screen in response to movement of said input focus; and
in response to receiving fourth user input, ceasing to move said first bounded region in response to the movement of said input focus.

6. The method of claim 1, further comprising:
in response to receiving third user input, ceasing to display said first bounded region on said screen; and
in response to receiving fourth user input, redisplaying said first bounded region on said screen.

7. The method of claim 1, wherein the method further comprises:
in response to receiving third user input, changing a size of said first bounded region from a first size to a second size through a series of one or more intermediate sizes,
wherein a center point of said first bounded region does not move on said screen during the changing of the size of said first bounded region, and
wherein said second portion of visual information is depicted at a same level of magnification during the changing of the size of said first bounded region.

8. The method of claim 1, further comprising:
in response to receiving third user input, causing a grid to be displayed over said second portion of said visual information, wherein said grid identifies pixels in said second portion of said visual information;
in response to receiving fourth user input, changing a magnification level of the display of said second portion of said visual information; and in response to detecting that said magnification level of said second portion of said visual information exceeds a threshold, ceasing to display said grid over said second portion of said visual information without receiving a request, from a user, to cease displaying said grid.

9. The method of claim 1, further comprising:
in response to receiving third user input, changing a magnification level at which said second portion of said visual information is displayed.

10. The method of claim 1, further comprising:
receiving third user input that requests a change to the visual appearance of said visual information;
prior to making said change to said visual information, updating the display of said second portion of said visual information to reflect said change;
in response to receiving fourth user input that accepts said change, making said change to said visual information.

11. The method of claim 1, wherein said first bounded region is identified by a second object, and wherein said second object displays information about the color and luminance values of a portion of said visual information identified by said second object.

12. The method of claim 1, further comprising:
in response to receiving third user input while said object is operating in either said second input-mode or said first input-mode, switching to operating in a cursor-attached mode;
while said object is in said cursor-attached mode, said object becomes the input focus.

13. A machine-implemented method for magnifying portions of visual information on a screen, comprising:
an operating system maintaining instructions for displaying, in response to receiving user input, an object, representing a loupe, and switching the displaying of the object from displaying the object in a first input-mode to displaying the object in a second input-mode, wherein the visual information has a first portion and a second portion, comprising:
while said displayed object is operating in said first input-mode, displaying the displayed object without displaying a separate input focus, and displaying, within a first bounded region, at a magnification level that is greater than the magnification level of said visual information that is outside of the first bounded region, the first portion of the visual information that is determined by a current location of the displayed object;
while said displayed object is operating in said first input-mode, in response to a first single user input action, switching from operating in said first input-mode to operating in said second input-mode by ceasing movements of said displayed object in accordance with movements of the input focus and displaying the input focus on the screen separate from said displayed object;
while said displayed object is in said second input-mode, continuously updating content displayed within the first bounded region as the input focus moves independently of the object;
wherein, while said displayed object is in said second input-mode, the content displayed within the first bounded region is centered upon a current location of the input focus, and displayed at a magnification level that is greater than the magnification level of the visual information that is outside of the first bounded region;
while said displayed object is operating in said second input-mode, in response to a second single user input action, switching form operating in said second input-mode to operating in said first input-mode by resuming movements of said displayed object in accordance with movements of the input focus and ceasing displaying the input focus on the screen separate from the displayed object;

wherein the method is performed by a computer programmed to be a special purpose machine pursuant to instructions from program software.

14. A non-transitory volatile or non-volatile medium storing instructions for magnifying selected portions of visual information on a screen, wherein execution of the instructions by one or more processors causes:

in response to receiving user input, displaying an object, representing a loupe, that includes a first visual indicator indicating a first bounded region for displaying a part of the visual information;

wherein the visual information has a first portion and a second portion;

wherein said object operates in a plurality of modes that includes at least a first input-mode and a second input-mode;

while said object is operating in said first input-mode, displaying the object without displaying a separate input focus, and displaying, within the first bounded region, at a magnification level that is greater than the magnification level of the visual information that is outside of the first bounded region, the first portion of the visual information that is determined by a current location of the object;

while said object is operating in said first input-mode, in response to a first single user input action, switching from operating in said first input-mode to operating in said second input-mode by ceasing movements of said object in accordance with movements of the input focus and displaying the input focus on the screen separate from the object;

while said object is in said second input-mode, continuously updating content displayed within the first bounded region as the input focus moves independently of the object;

wherein, while said object is in said second input-mode, the content displayed within the first bounded region is centered upon a current location of the input focus, and displayed at a magnification level that is greater than the magnification level of the visual information that is outside of the first bounded region;

while said object is operating in said second input-mode, in response to a second single user input action, switching from operating in said second input-mode to operating in said first input-mode by resuming movements of said object in accordance with movements of the input focus and ceasing displaying the input focus on the screen separate from the object.

15. The volatile or non-volatile medium of claim 14, wherein said first single user input action and said second single user input action are any of: pressing a button and ceasing pressing said button.

16. The non-transitory volatile or non-volatile medium of claim 14, wherein said first bounded region has a shape of any one of: a circle, a square, a rectangle, an oval, and a user-configurable shape.

17. The non-transitory volatile or non-volatile medium of claim 14, wherein execution of the instructions by the one or more processors further causes:

in response to receiving third user input while said input focus is positioned at a particular position, automatically moving, on said screen, said object, through a series of intermediate positions arranged in a line, from an initial position to the particular position, wherein said series of intermediate positions are determined based upon said initial position and said particular position and are not determined based on movement of said input focus.

18. The non-transitory volatile or non-volatile medium of claim 14, wherein execution of the instructions by the one or more processors further causes:

in response to receiving third user input, moving said first bounded region on said screen in accordance with movement of said input focus; and in response to receiving fourth user input, ceasing to move said first bounded region in accordance with the movement of said input focus.

19. The non-transitory volatile or non-volatile medium of claim 14, wherein execution of the instructions by the one or more processors further causes:

in response to receiving third user input, moving said first bounded region on said screen in response to movement of said input focus; and in response to receiving fourth user input, ceasing to move said first bounded region in response to the movement of said input focus.

20. The non-transitory volatile or non-volatile medium of claim 14, wherein execution of the instructions by the one or more processors further causes:

in response to receiving third user input, changing a size of said first bounded region from a first size to a second size through a series of one or more intermediate sizes, wherein a center point of said first bounded region does not move on said screen during the changing of the size of said first bounded region, and wherein said second portion of visual information is depicted at a same level of magnification during the changing of the size of said first bounded region.

21. The non-transitory volatile or non-volatile medium of claim 14, wherein execution of the instructions by the one or more processors further causes:

in response to receiving third user input, causing a grid to be displayed over said second portion of said visual information, wherein said grid identifies pixels in said second portion of said visual information;

in response to receiving fourth user input, changing a magnification level of the display of said second portion of said visual information; and in response to detecting that said magnification level of said second portion of said visual information exceeds a threshold, ceasing to display said grid over said second portion of said visual information without receiving a request, from a user, to cease displaying said grid.

22. The non-transitory volatile or non-volatile medium of claim 14, wherein execution of the instructions by the one or more processors further causes:

in response to receiving third user input, changing a magnification level at which said second portion of said visual information is displayed.

23. The volatile or non-volatile medium of claim 14, wherein execution of the instructions by the one or more processors further causes:

receiving third user input that requests a change to the visual appearance of said visual information;

prior to making said change to said visual information, updating the display of said second portion of said visual information to reflect said change;

in response to receiving fourth user input that accepts said change, making said change to said visual information.

24. The volatile or non-volatile medium of claim 14, wherein said first bounded region is identified by a second object, and wherein said second object displays information about the color and luminance values of a portion of said visual information identified by said second object.

25. The non-transitory volatile or non-volatile medium of claim 14, wherein execution of the instructions by the one or more processors further causes:

in response to receiving third user input while said object is operating in either said second input-mode or said first input-mode, switching to operating in a cursor-attached mode;

while said object is in said cursor-attached mode, said object becomes the input focus.

26. An apparatus for magnifying selected portions of visual information on a screen, comprising:

one or more processors; and a machine-readable medium carrying instructions, wherein execution of the instructions by the one or more processors causes:

in response to receiving user input, displaying an object, representing a loupe, that includes a first visual indicator indicating a first bounded region for displaying a part of the visual information;

wherein the visual information has a first portion and a second portion;

wherein said object operates in a plurality of modes that includes at least a first input-mode and a second input-mode;

while said object is operating in said first input-mode, displaying the object without displaying a separate input focus, and displaying, within the first bounded region, at a magnification level that is greater than the magnification level of the visual information that is outside of the first bounded region, the first portion of the visual information that is determined by a current location of the object;

while said object is operating in said first input-mode, in response to a first single user input action, switching from operating in said first input-mode to operating in said second input-mode by ceasing movements of said object in accordance with movements of the input focus and displaying the input focus on the screen separate from the object;

while said object is in said second input-mode, continuously updating content displayed within the first bounded region as the input focus moves independently of the object;

wherein, while said object is in said second input-mode, the content displayed within the first bounded region is centered upon a current location of the input focus, and displayed at a magnification level that is greater than the magnification level of the visual information that is outside of the first bounded region;

while said object is operating in said second input-mode, in response to a second single user input action, switching from operating in said second input-mode to operating in said first input-mode by resuming movements of said object in accordance with movements of the input focus and ceasing displaying the input focus on the screen separate from the object.

27. The apparatus of claim 26, wherein said first single user input action and said second single user input action are any of: pressing a button and ceasing pressing said button.

28. The apparatus of claim 26, wherein said first bounded region has a shape of any one of: a circle, a square, a rectangle, an oval, and a user-configurable shape.

29. The apparatus of claim 26, wherein execution of the instructions by the one or more processors further causes:

in response to receiving third user input while said input focus is positioned at a particular position, automatically moving, on said screen, said object, through a series of intermediate positions arranged in a line, from an initial position to the particular position, wherein said series of intermediate positions are determined based upon said initial position and said particular position and are not determined based on movement of said input focus.

30. The apparatus of claim 26, wherein execution of the instructions by the one or more processors further causes:

in response to receiving third user input, moving said first bounded region on said screen in response to movement of said input focus; and in response to receiving fourth user input, ceasing to move said first bounded region in response to the movement of said input focus.

31. The apparatus of claim 26, wherein execution of the instructions by the one or more processors further causes:

in response to receiving third user input, ceasing to display said first bounded region on said screen; and in response to receiving fourth user input, redisplaying said first bounded region on said screen.

32. The apparatus of claim 26, wherein execution of the instructions by the one or more processors further causes:

in response to receiving third user input, changing a size of said first bounded region from a first size to a second size through a series of one or more intermediate sizes, wherein a center point of said first bounded region does not move on said screen during the changing of the size of said first bounded region, and wherein said second portion of visual information is depicted at a same level of magnification during the changing of the size of said first bounded region.

33. The apparatus of claim 26, wherein execution of the instructions by the one or more processors further causes:

in response to receiving third user input, causing a grid to be displayed over said second portion of said visual information, wherein said grid identifies pixels in said second portion of said visual information;

in response to receiving fourth user input, changing a magnification level of the display of said second portion of said visual information; and in response to detecting that said magnification level of said second portion of said visual information exceeds a threshold, ceasing to display said grid over said second portion of said visual information without receiving a request, from a user, to cease displaying said grid.

34. The apparatus of claim 26, wherein execution of the instructions by the one or more processors further causes:

in response to receiving third user input, changing a magnification level at which said second portion of said visual information is displayed.

35. The apparatus of claim 26, wherein execution of the instructions by the one or more processors further causes:

receiving third user input that requests a change to the visual appearance of said visual information;

prior to making said change to said visual information, updating the display of said second portion of said visual information to reflect said change;

in response to receiving fourth user input that accepts said change, making said change to said visual information.

36. The apparatus of claim 26, wherein said first bounded region is identified by a second object, and wherein said second object displays information about the color and luminance values of a portion of said visual information identified by said second object.

37. The apparatus of claim 26, wherein execution of the instructions by the one or more processors further causes:

in response to receiving third user input while said object is operating in either said second input-mode or said first input-mode, switching to operating in a cursor-attached mode;

while said object is in said cursor-attached mode, said object becomes the input focus.

* * * * *

UNITED STATES PATENT AND TRADEMARK OFFICE
CERTIFICATE OF CORRECTION

| | | |
|---|---|---|
| PATENT NO. | : 7,889,212 B2 | Page 1 of 1 |
| APPLICATION NO. | : 11/518476 | |
| DATED | : February 15, 2011 | |
| INVENTOR(S) | : Egan Schulz et al. | |

It is certified that error appears in the above-identified patent and that said Letters Patent is hereby corrected as shown below:

Title Page, Item (56) References Cited, Foreign Patent Documents:

Insert -- EP 0990996 A 04-05-2000 --
(Cited as a reference and acknowledged by Examiner on 10/18/2008.)

Signed and Sealed this
Nineteenth Day of April, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,889,212 B2 | Page 1 of 1 |
| APPLICATION NO. | : 11/518476 | |
| DATED | : February 15, 2011 | |
| INVENTOR(S) | : Egan Schulz et al. | |

It is certified that error appears in the above-identified patent and that said Letters Patent is hereby corrected as shown below:

On Title page 2, in column 1, item (56) under "Other Publications", line 3, delete "magnifieir" and insert -- magnifier --, therefor.

On Title page 2, in column 2, item (56) under "Other Publications", line 27, before "9 pages." insert -- received Mar. 9, 2006, --.

On Title page 2, in column 2, item (56) under "Other Publications", line 62, before "11 pages." insert -- received May 28, 2008, --.

In column 18, line 66, in claim 13, delete "form" and insert -- from --, therefor.

Signed and Sealed this
Twenty-second Day of November, 2011

David J. Kappos
*Director of the United States Patent and Trademark Office*